United States Patent
Nielsen et al.

(10) Patent No.: US 7,098,846 B2
(45) Date of Patent: Aug. 29, 2006

(54) ALL-WEATHER PRECISION GUIDANCE AND NAVIGATION SYSTEM

(75) Inventors: Ray R. Nielsen, Orlando, FL (US); Stephen P. Phillips, Orlando, FL (US); Richard Kirchofor, Cocoa, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/706,988

(22) Filed: Nov. 14, 2003

(65) Prior Publication Data

US 2005/0012660 A1 Jan. 20, 2005

Related U.S. Application Data

(60) Provisional application No. 60/426,404, filed on Nov. 15, 2002.

(51) Int. Cl.
G01S 5/14 (2006.01)
(52) U.S. Cl. ............... 342/357.02; 342/357.03
(58) Field of Classification Search ........... 342/357.02, 342/357.03; 244/3.14, 3.19
See application file for complete search history.

(56) References Cited

U.S. PATENT DOCUMENTS

| | | | |
|---|---|---|---|
| 3,646,558 A | 2/1972 | Campanella | |
| 5,021,792 A | 6/1991 | Hwang | |
| 5,181,025 A | 1/1993 | Ferguson et al. | |
| 5,187,487 A | 2/1993 | Riza | |
| 5,191,339 A | 3/1993 | Riza | |
| 5,210,541 A | 5/1993 | Hall et al. | |
| 5,231,406 A | 7/1993 | Sreenivas | |
| 5,260,709 A * | 11/1993 | Nowakowski | 342/62 |
| 5,323,322 A * | 6/1994 | Mueller et al. | 701/215 |
| 5,344,105 A * | 9/1994 | Youhanaie | 244/3.14 |
| 5,402,347 A | 3/1995 | McBurney et al. | |
| 5,430,451 A | 7/1995 | Kawanishi et al. | |
| 5,515,057 A | 5/1996 | Lennen et al. | |
| 5,534,875 A | 7/1996 | Diefes et al. | |
| 5,554,994 A * | 9/1996 | Schneider | 342/357.06 |
| 5,608,414 A | 3/1997 | Amore | |
| 5,633,645 A | 5/1997 | Day | |

(Continued)

FOREIGN PATENT DOCUMENTS

WO WO98/16077 A2 4/1998

OTHER PUBLICATIONS

Holeman, Dennis L., "Impacts of 1-Meter GPS Navigation on Warfinghting," IEEE PLANS, 1996, Apr. 1996, pp. 530-537.*

(Continued)

Primary Examiner—Gregory C. Issing
(74) Attorney, Agent, or Firm—Buchanan Ingersoll PC (57) ABSTRACT

A location of a target is generated by, at each of a plurality of reference sensors, receiving signals from a plurality of positioning system satellites. A set of error measurements are generated by generating, for each of the reference sensors, one or more error measurements based on a reference location of the reference sensor and information derived from the signals received at the reference sensors from the plurality of position system satellites. Single differenced velocity corrections are also generated. At a central processing node, a meta-correction surface is generated from the set of error measurements. The meta-correction surface is then transmitted to a non-reference sensor. At the non-reference sensor, signals are received from a plurality of the positioning system satellites. The meta-correction surface and the signals received from the plurality of position system satellites are used to generate the location of the target.

38 Claims, 5 Drawing Sheets

U.S. PATENT DOCUMENTS

| | | | |
|---|---|---|---|
| 5,642,122 | A | 6/1997 | Lockie et al. |
| 5,818,385 | A | 10/1998 | Bartholomew |
| 5,831,576 | A * | 11/1998 | Sheynblat ............. 342/357.03 |
| 5,899,957 | A | 5/1999 | Loomis |
| 5,917,446 | A | 6/1999 | Greenspan |
| 5,952,968 | A | 9/1999 | McDowell |
| 6,061,019 | A | 5/2000 | Miyoshi |
| 6,023,242 | A | 7/2000 | Dixon et al. |
| 6,084,540 | A | 7/2000 | Yu |
| 6,166,690 | A | 12/2000 | Lin |
| 6,178,333 | B1 | 1/2001 | Feuerstein et al. |
| 6,512,481 | B1 | 1/2001 | Velazquez et al. |
| 6,377,211 | B1 | 4/2002 | Hsiung |
| 2001/0003443 | A1 | 6/2001 | Velazquez et al. |
| 2002/0034967 | A1 | 3/2002 | Taniguchi et al. |

OTHER PUBLICATIONS

Enge, Per et al, "Wide Area Augmentation of the Global Positioning System," Proc. of the IEEE, vol. 84, No. 8, Aug. 1996, pp. 1063-1088.*

International Search Report dated May 27, 2003; International Application No. PCT/US02/21440.

"Marine Artillery Survey Operations", MCWP 3-16.7, U.S. Marine Corps (Combat Development Command, Doctrine Division), Jan. 28, 2002, Table of Contents, pp. i-xvii, Chap. 9, pp 9-16 and 9-17.

* cited by examiner

ALL-WEATHER PRECISION GUIDANCE AND NAVIGATION SYSTEM

CROSS REFERENCE TO RELATED APPLICATION

This application claims the benefit of U.S. Provisional Application No. 60/426,404, filed Nov. 15, 2002, which is hereby incorporated herein by reference in its entirety.

FIELD OF THE INVENTION

The present invention generally relates to navigation and guidance systems, and more particularly is directed to a closed loop precision navigation guidance system, which improves on information from navigational satellites, such as the Global Positioning System.

BACKGROUND OF THE INVENTION

The Global Positioning System (GPS) was implemented in the 1970's as a means to provide reliable positioning information for any location on the globe. Since its inception, the GPS has become increasingly employed in a variety of different types of applications that require accurate measurement of location on the surface of the earth. Some of the different applications which make use of information provided by the GPS include geo-location measuring applications, vehicle navigation applications, tracking applications, mapping applications and timing applications.

Data that is sent from GPS satellites can be used by location measuring applications to determine the position on the earth of a data-receiving device. GPS receivers may be useful for personal recreation activities, such as hiking, kayaking, skiing and other activities that may be carried out in remote locations. Location measuring applications may also be used in moving vehicles, such as automobiles and airplanes, to determine their instantaneous location, and thereby assist in navigating to a particular destination. Location measuring applications also find use in the military field, where increasingly more accurate position information is required for targeting and personnel location.

Navigation applications that employ GPS data are becoming more common in moving vehicles, particularly for determining the best path to be taken to reach a desired destination. For example, automobiles may incorporate GPS receivers to determine present location, and use this information in connection with known street layout information to determine the shortest, or most fuel efficient, path to a desired destination. Similarly, aircraft may employ GPS information for navigational purposes, as well as for landing and take-off guidance. In military applications, GPS data is useful in maneuvering blindly, such as at night, or without the aid of lights or other instruments.

Tracking applications employ GPS data to monitor the movement of people and things. For example, the military may employ GPS tracking applications to monitor the movement of troops and equipment. Emergency response systems might use tracking applications to determine the present location of emergency medical response teams, in an effort to minimize the time required to reach a victim at a desired location.

Mapping applications that utilize GPS signals can be used in cartography for creating more accurate maps. Land surveying and marine surveying may also be enhanced by mapping applications that utilize GPS information. In addition, construction and agriculture may both be improved by mapping applications that utilize precision GPS data to accurately align buildings or crops.

Other applications may employ GPS data to determine precise timing, for example to synchronize widely spaced devices. For example, applications such as mobile communications may achieve high levels of timing precision by utilizing the atomic clocks resident on GPS satellites, without incurring the high cost of incorporating such clocks themselves.

From the foregoing, it can be seen that many different applications make advantageous use of the data provided through the GPS. This data can be obtained from any one or more of the twenty-four satellites that currently constitute the GPS constellation. These satellites are placed in orbits such that a minimum of five satellites are in view from every point on the globe at any given time. Many GPS receivers are configured with an almanac, to enable the receiver to determine the present, or expected, location of each of the GPS satellites.

While the GPS data is useful in a variety of different applications, the preciseness of that data is subject to a number of different errors. For example, some of the errors which can affect the data at a GPS receiver include errors in the satellite clocks, satellite orbital ephemeris error, signal propagation delays induced by the ionosphere and troposphere, errors in the receiver clock, receiver noise, and multi-path propagation. The cumulative effect of these various errors can lead to differences of several meters between an actual position and the position indicated by the GPS receiver. These errors also vary with time since the GPS satellite constellation is moving relative to the Earth and the atmosphere is continually changing. While many applications are not sensitive to errors of this magnitude, such as automobile navigation or personnel tracking, other applications may require extremely precise positioning information. For example, in the landing of an airplane on an aircraft carrier, a positioning error of 10 meters could lead to very drastic results. Accordingly, various efforts have been undertaken to minimize the errors that are inherent to GPS data.

One commonly employed approach to reducing errors in GPS positioning data is known as "differential GPS." In addition to the mobile GPS receiver that is employed to determine a location, differential GPS utilizes a second, stationary GPS receiver. The location of the stationary GPS receiver is precisely known, and therefore can be used to calculate errors in the signals from the GPS satellite. In essence, the stationary GPS receiver operates in the opposite manner from the mobile GPS receivers. Rather than employ timing signals from the GPS satellites to determine location, the stationary GPS receiver utilizes its known location to estimate what the timing signals from the various satellites should be. These estimated timing signals are then compared to the actual timing signals from the satellites, to compute the errors. These computed errors are used to calculate position-correction data, which is transmitted to the mobile receivers over line of sight (LOS) radio data links. At the mobile GPS receivers, the correction data is used to compensate for the errors in the received GPS satellite signals, and thereby provide a more precise determination of location. Differential GPS accuracy is limited to a few meters compared with standard GPS that is accurate to tens of meters.

While differential GPS enhances the accuracy of the Global Positioning System, its applicability is relatively limited. A significant consideration in this regard is the fact the mobile GPS receiver must be located relatively close to the stationary GPS receiver for the correction data to be useful. As the distance between the mobile GPS receiver and the stationary GPS receiver increases, the GPS satellite data errors which occur at their respective locations will differ, for example due to differing atmospheric and/or signal propagation conditions. Consequently, differential GPS systems are only effective in those situations where the mobile GPS receiver operates in an area that is within a few hundred miles of the stationary GPS receiver. At greater distances, the correction data from the stationary GPS receiver is no longer reliable.

This limited effective range of differential GPS restricts its applicability in certain situations. For example, differential GPS would not be available to ships or airplanes in the middle of the ocean. Similarly, in military applications it is not feasible to locate the stationary GPS receivers within a theater of combat. Hence, if the theater of operation is relatively large, differential GPS cannot be employed to locate or track equipment or personnel within its confines. To overcome these limitations in the ability to locate a target, terminal seekers are employed. These devices rely upon an operator to designate and track a target, for purposes of guiding a moving vehicle to the target. However, terminal seekers of this type are quite expensive, and therefore it is desirable to minimize their use. In addition, they cannot be employed in adverse weather, where the ability to designate the target is compromised.

Current differential GPS cannot provide the precision position and velocity information required to reduce weapon system combined delivery errors to the levels achieved by terminal seekers today. This is due to the uncompensated target location errors, or errors in the assumption of the actual target coordinates relative to the navigation solution in the weapon. Current code phase GPS receivers typically provide velocity data derived from Doppler measurements on the LOS ranging signals from each tracked GPS satellite. Typical performance for the highest quality military P(Y) code receivers is in the 10 cm/sec range. (The notation "P(Y)" refers to the encrypted precise form of GPS signal.)

U.S. Pat. No. 5,899,957 to Loomis (henceforth, "Loomis") discloses a method and apparatus for providing GPS pseudorange correction information over a selected geographic region S with a diameter of up to 300 km with an associated inaccuracy no greater than 5 cm. N spaced apart GPS reference stations (N>4), whose location coordinates are fixed and are known with high accuracy, are provided within or adjacent to a region R. Each reference station receives GPS signals from at least four common-view GPS satellites, computes its own GPS-determined location coordinates, compares these coordinates with its known location coordinates, determines the pseudorange corrections for its GPS-determined location, and transmits these correction signals to a central station located within or adjacent to a region S. The central station retransmits the pseudorange correction signals throughout the region S. A mobile GPS station within or adjacent to the region S has stored within it the coordinates of the GPS-determined last location of that mobile station and the spatial coordinates of K GPS reference stations (K>3) within S that are closest to the last-determined location of that mobile station. The mobile station then computes the differential GPS corrections for the GPS-determined present location of that mobile station.

The system of Loomis is limited in that the pseudorange correction signals retransmitted by the central station are useful only over a limited geographic area. It is therefore desired to provide a system capable of generating and supplying useful correction information to mobile GPS stations over a much greater area, while using significantly fewer reference GPS receivers.

SUMMARY OF THE INVENTION

The present invention provides a precise relative guidance and navigation system that is generally independent of weather conditions. Moreover, it is capable of generating useful correction information that can be supplied to mobile GPS receivers situated over a far greater geographic area than has been possible heretofore, while requiring fewer reference sensors than would have been required by prior art techniques covering the same geographic area. One aspect of the invention that makes this improvement possible is the use of single differenced velocity corrections, as will be described in greater detail below.

In one embodiment, a location of a target is generated by, at each of a plurality of reference sensors, receiving signals from a plurality of positioning system satellites. A set of error measurements are generated by generating, for each of the reference sensors, one or more error measurements based on a reference location of the reference sensor and information derived from the signals received at the reference sensors from the plurality of position system satellites. Single differenced velocity corrections are also generated. At a central processing node, a meta-correction surface is generated from the set of error measurements. The meta-correction surface is then transmitted to a non-reference sensor. At the non-reference sensor, signals are received from a plurality of the positioning system satellites. The meta-correction surface and the signals received from the plurality of position system satellites are used to generate the location of the target.

Further features of the invention, and the advantages provided thereby, are described in detail hereinafter with reference to exemplary embodiments of the invention illustrated in the accompanying drawings.

DETAILED DESCRIPTION

To facilitate an understanding of the principles upon which the present invention is based, it is described hereinafter with reference to its application to military solutions in the guidance of a weapon towards a designated target. It will be appreciated, however, that the practical applications of the invention are not limited to this particular embodiment. Rather, the invention will find utility in a variety of different situations, which can benefit from precise location data. By way of example, the present invention can be further employed to provide precision guidance and navigation for a variety of mobile platforms such as planes, trains, ships, automobiles, as well as individuals.

To further facilitate an understanding of the invention, an overview of an exemplary system will first be described. In this exemplary system, a plurality of spaced apart GPS sensors form a network of GPS sensors and define the extent of a theater of operations in which guidance and navigation to locations therein can have greatly improved precision. Each GPS sensor separately measures at least four common, line-of-sight GPS satellite signals. The theater of operation can have an aerial extent of at least a 1000-mile radius. Two types of reference GPS sensors can be used in this system: stationary Reference Ground Sensors (RGSs), and low dynamic and mobile Reference Roving Sensors (RRSs). These reference GPS sensors include data processing that samples and filters the GPS satellite signals. The RRS additionally contains a high quality inertial instrument that measures the motion of the mobile RGS platform, so that its motion can be properly tracked.

The errors in the reference GPS sensor data are transmitted to a Central Processing Node (CPN) where it is used to estimate GPS systematic errors and calculate a theater wide meta-correction surface (collectively referred to as correction data) to be transmitted to mobile precision navigation units (PNUs). This correction data is converted to a compressed format and can be transmitted to users over a non-LOS limited satellite communication link. The CPN processing performs a system wide calibration of the RGS network and adjusts the system reference datum or grid to a common stable datum with other user systems. The RRS positions are continuously updated by the CPN, using a combination of carrier phase GPS data and the inertial data measured by the reference sensor. The corrections from the CPN can be used by any number of Precision Navigation Units (PNUs) that operate in the theater defined by the reference sensors. An additional PNU resides on the RRS in order to maintain an accurate estimate of the current location of the RRS for use in reference data processing in the CPN. Each PNU transforms the meta-correction surface to a single virtual correction that provides GPS position and velocity corrections for the current location on the earth. (The correction is considered "virtual" in the sense that no physical remote sensor equipment resides at the location the corrections are valid for.) This precise navigation information can be applied to both fire control targeting platforms and weapon system guidance platforms. The precision position and velocity provided by the PNU to a fire control system aids sensor pointing and motion compensation that improves the accuracy of the system and/or algorithm that generates fire control commands (henceforth referred to as the "fire control solution"). The precision velocity provided by the PNU to a weapon aids in the alignment of the weapon navigation systems inertial instruments. The use of a common datum between the fire control system and the weapon systems removes a significant source of error and ensures that the acquiring, tracking, and/or destroying (henceforth referred to as "prosecution") of a target remains relative. Since the guided vehicle needs no other navigation or targeting aid, expensive terminal seeker equipment is not required, which in turn eliminates the dependence upon favorable weather conditions.

The various principles employed in the invention will now be described in greater detail in connection with the following exemplary embodiments.

Figure 1:
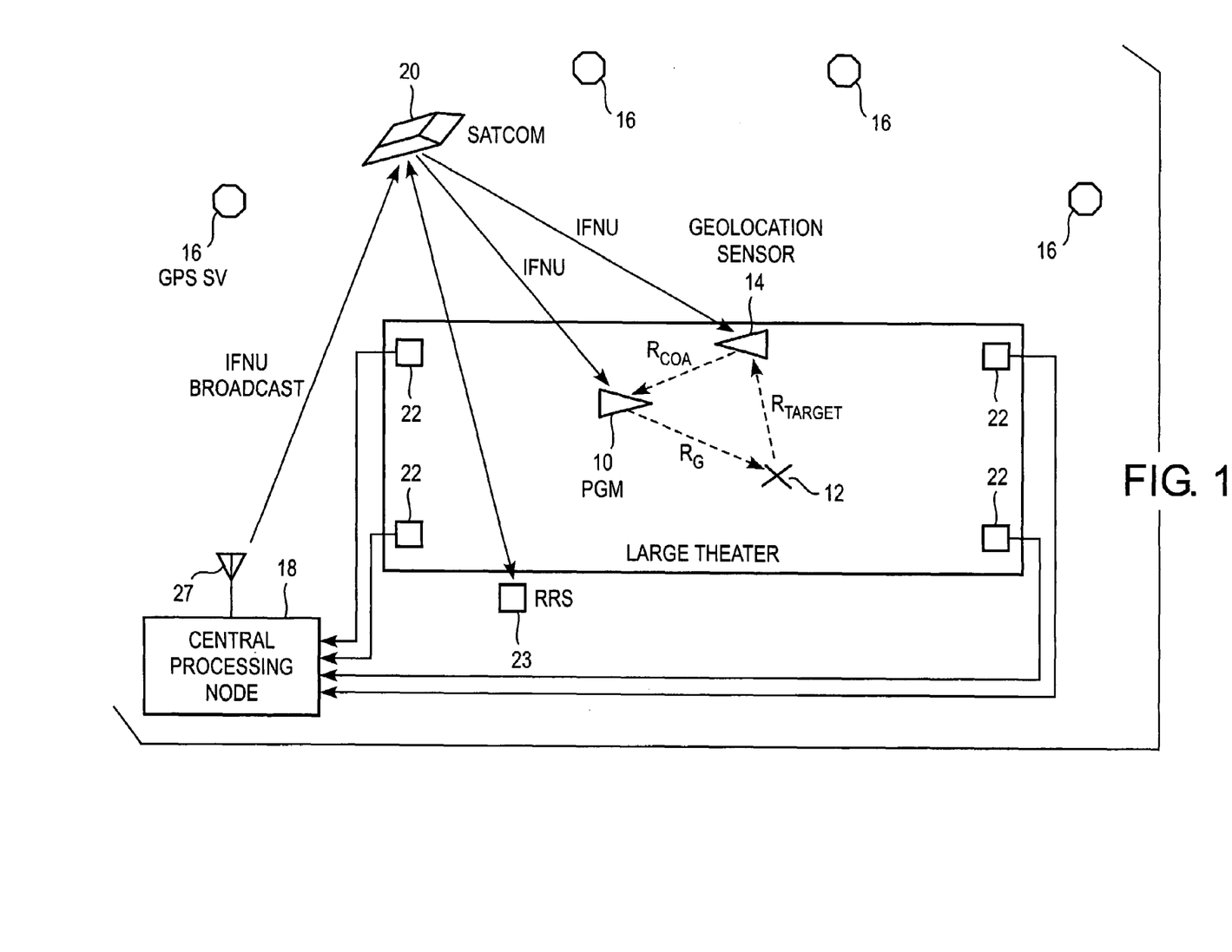
FIG. 1 is a schematic diagram of an all-weather precise guidance system in accordance with the present invention.

One environment in which the present invention can be employed is depicted in FIG. 1. This figure schematically illustrates a situation in which a precision guided munition (PGM) or weapon 10 is being precisely guided to a target 12. The targeting of the weapon 10 is carried out by a precision navigation unit (PNU) (not shown), which is mounted with each of the fire control platform 14 and the weapon 10. The fire control platform 14 computes the location of the target 12 relative to it using a geo-location (e.g. GPS, INS) sensor and precision navigation and guidance data developed by the PNU in accordance with the present invention (either a priori or in real time). The targeting data that identify the location of the target 12 are then provided to the weapon 10 so that it can prosecute the target.

To precisely determine location 12, the PNU with the fire control platform 14 uses known geo-location techniques in combination with the herein-described correction techniques to first determine the location of fire control platform 14 based on positioning information provided by a plurality of GPS satellites 16. From this location, the fire control platform 14 determines the relative position of the target 12. The coordination of PNU data and the relative position data can provide an absolute position of the target 12, which is then relayed to the weapon 10.

In accordance with the present invention, correction data is calculated at a central processing node (CPN) 18, and provided to the PNU. In the illustrated example, the correction data is relayed to a PNU with each weapon 10 and fire control platform 14 by means of a communications satellite 20. The correction data is calculated from data supplied by a plurality of RGSs 22 and RRSs 23, herein also referred to collectively as GPS sensors 22, 23. The RGSs 22 are stationary whereas the RRSs 23 can be moving in a low dynamic environment. The positioning of the remote GPS sensors 22, 23 approximates a theatre of operations within which it is desired to provide precise guidance and navigation information. Generally, the network of GPS sensors requires at least three spaced apart GPS sensors 22, 23 each receiving GPS satellite signals from at least four common line-of-sight GPS satellites 16. These remote GPS sensors 22, 23 can be located at relatively great distances from the CPN 18 and from each other, for example a thousand miles or more.

This approach addresses operational requirements for providing navigation and guidance information to GPS sensors (e.g., ships at sea), combined within a large and often hostile theater of operations.

Figure 2:
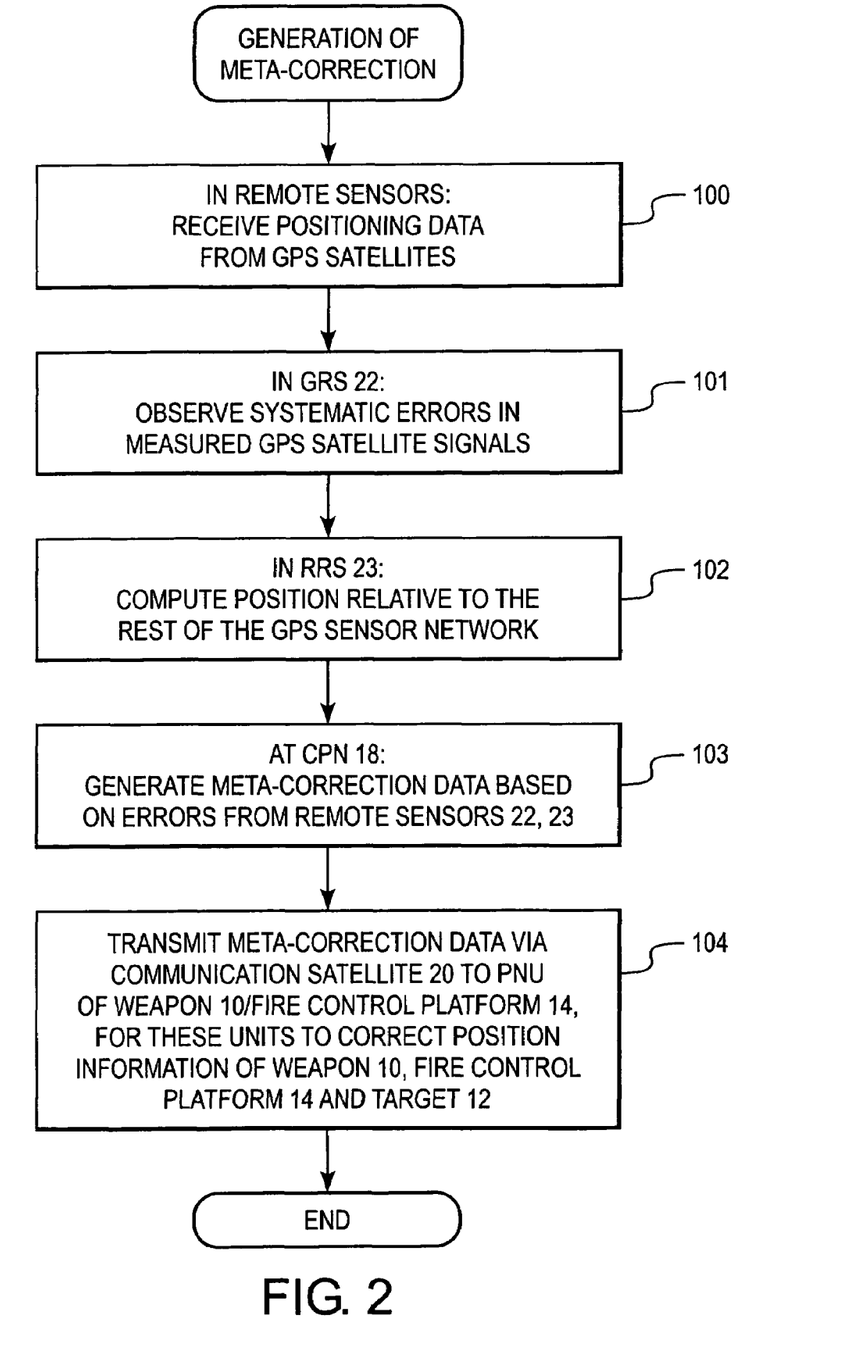
FIG. 2 is a flow diagram illustrating steps performed in an all-weather precise guidance system in accordance with the present invention.

In operation and with reference to FIG. 1 and FIG. 2, each of the remote GPS sensors 22 and 23 receives positioning data from at least four common, line-of-sight GPS satellites 16 (step 100). Since the location of each RGS 22 is precisely calculated (the RGSs 22 are stationary), each of the RGSs 22 is able to observe systematic errors in the measured satellite signals from each of the GPS satellites 16 (step 101). These errors include residual broadcast GPS satellite ephemeris and clock errors, differences between the tropospheric delay model and the true delays, and residual ionospheric delay errors.

Each RRS 23 (which can be mobile) first computes its position relative to the rest of the GPS sensor network (step 102) by processing carrier phase differential double differences relative to the stationary GPS sensors 22. This process provides precise relative positioning to the GPS network. The observations of the GPS satellite signals determined at each of the remote sensors 22, 23 are transmitted to the CPN 18. At the CPN 18, the errors from each of the remote sensors 22, 23 are processed to generate meta-correction data, which identifies positioning and velocity errors over the entirety of theater of operations, (step 103). The extent of theater of operations is approximately defined by the location of the remote sensors 22, 23. In fact, the minimum extent of utility of the present invention is generally within the three-dimensional volume defined by at least three remote sensors 22, 23 on circumscribing the theater.

This meta-correction data is transmitted to the PNUs with the weapon 10 and the fire control platform 14 for their use in correcting the position and information of the weapon 10, fire control platform 14, and target 12, at step 104. By transmitting this data through a communication satellite 20, as in the illustrated example, the need for line-of-sight communications between the CPN 18 and the weapon 10 and fire control platform 14 is eliminated. The meta-correction data from the CPN 18 enables the fire control platform 14 to more accurately identify the location of the target 12. In addition, the weapon 10 can more accurately determine its position relative to the target 12, to thereby provide precise delivery of the weapon 10 to the target 12.

Figure 3:
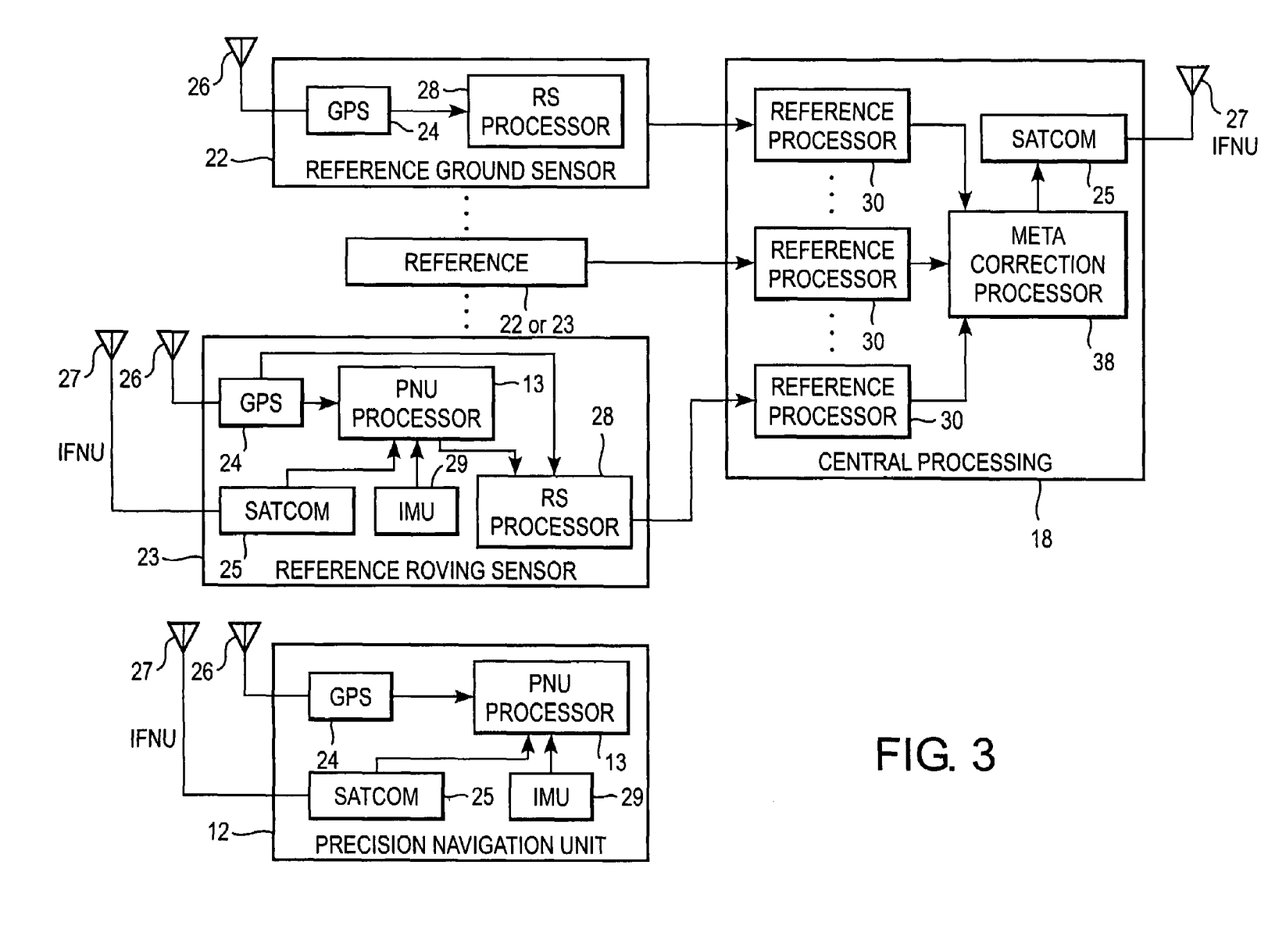
FIG. 3 is a general block diagram of the reference sensors, the central processing node (CPN), and the precision navigation unit (PNU)

The present invention will now be discussed in more detail with reference to FIG. 3, which is a block diagram of the CPN 18 and remote GPS sensors 22, 23. Each remote GPS sensor 22, 23 includes a conventional GPS receiver 24. In a preferred embodiment of the invention, each GPS receiver 24 is capable of receiving GPS satellite signals in both the L1 and L2 frequency bands that are employed for GPS satellite transmissions. In a further preferred embodiment of the invention, the antenna system 26 that is employed by the GPS receiver 24 comprises an interference rejection antenna of the type disclosed in commonly assigned U.S. application Ser. No. 09/902,095, filed Jul. 11, 2001.

The satellite signals from the GPS satellites 16 are received at each of the reference GPS sensors 22, 23, and are provided to a reference sensor processor 28. The purpose of the reference sensor processor 28 is to filter noise out of the raw GPS data and format lower frequency output data for transmission to the CPN 18. The GPS data includes both pseudorange and carrier phase measurements for each of the GPS satellites 16 that are within line-of-sight of the reference GPS sensors 22, 23, as well as the carrier phase, ephemeris (predicted satellite position) and time tags received from each of the GPS satellites 16. Updated data of this nature is transmitted from the reference sensors 22, 23 to the CPN 18 on a regular basis, for example, once every two seconds. The current time and the position of each reference sensor 22, 23 is also communicated to CPN 18. The reference GPS sensors 22, 23 provide data in the identical format to the CPN 18.

The RRS 23 contains additional processing functions to compensate for the motion of its moving platform and GPS sensor. The RRS 23 receives wide area meta-corrections, calculated by CPN 18 through the satellite communications (SATCOM) antenna system 27 through an in-flight navigation update (IFNU) message. SATCOM processing 25 takes the meta-correction message and converts it to a set of virtual corrections that are valid for the current location of the RRS 23. These virtual corrections are then combined in the processor 13 with the satellite data from the onboard GPS receiver 24 and used to correct an inertial navigation solution (which includes position, velocity, attitude and time values) generated from the measurements read from the Inertial Measurement Unit (IMU) 29. Processor 13 uses navigation algorithms to provide a high quality integrated navigation solution to the RS processor 28, which formats the GPS data and the IMU position data into a Radio Technical Commission for Maritime Services (RTCM-104) standard data stream that is sent to the CPN 18.

The CPN 18 contains a set of Reference Processors 30 that decode the RTCM-104 standard data stream and provide the decoded data to a meta processor 38. The meta processor 38 calculates a set of corrections for each satellite measurement by computing the difference between the estimated satellite position and the known position of the reference sensor 22, 23, and then differencing this estimated range with the GPS pseudorange and carrier phase measurement. Two processing steps are performed to improve the accuracy and robustness of this correction calculation. The GPS pseudorange measurement is smoothed with GPS carrier phase information through the use of a Hatch filter. This is done in order to average out the multi-path effects that influenced the pseudorange in order to provide a smoother and more accurate estimate of the range and time measurement between the GPS satellites 16 and each of the reference sensors 22, 23. The meta processor 38 uses cycle slip detection and repair logic to maintain a continuous carrier phase track on each GPS satellite 16. The cycle slip detection and repair algorithm uses a precision velocity approach to determine the expected motion between the satellite 16 and reference sensor 22, 23 to within a fraction of a carrier cycle. This allows integral cycle slips to be detected and computed, so that the carrier phase measurement can be repaired to its original form. A second processing step for the meta processor 38 involves a single difference algorithm to cancel receiver clock errors. Since receiver clock errors are a major source of errors in the GPS measurement system, the single difference processing provides a large benefit to the precision of the resulting GPS solution. For the CPN 18, a single difference technique is employed in order to cancel the GPS receiver clock bias. This involves subtracting two independent satellite measurements from one another, so that the resulting computed measurement contains no receiver clock errors whatsoever. This results in a set of correlated corrections and measurements that is ultimately used in the processor 13. The resulting corrections are transformed into a set of wide area meta-corrections in the meta processor 38, and broadcast to the system users (both PNU 12 and RRS 23) using a SATCOM processor 25 over a SATCOM antenna 27.

The processor 13 in the PNU 12 receives the meta-correction over the SATCOM antenna 27 and processor 25, and uses these wide area corrections to compute a virtual correction corresponding to the PNU 12 location. The virtual correction is applied to the measurements from the onboard GPS receiver 24, and decorrelated to uncouple the single differenced measurements and make them once more independent through the use of an algorithm. These measurements are then fed into an onboard navigation filter (not shown) in the PNU processor 13, and combined with data from-the IMU 29 to provide a precise navigation solution. This approach applied to the GPS pseudoranges provides precise positioning of the PNU 12, while the same approach applied to the GPS carrier phases provides precise velocity that is used to align the onboard IMU 29 for the PNU 12.

Figure 4:
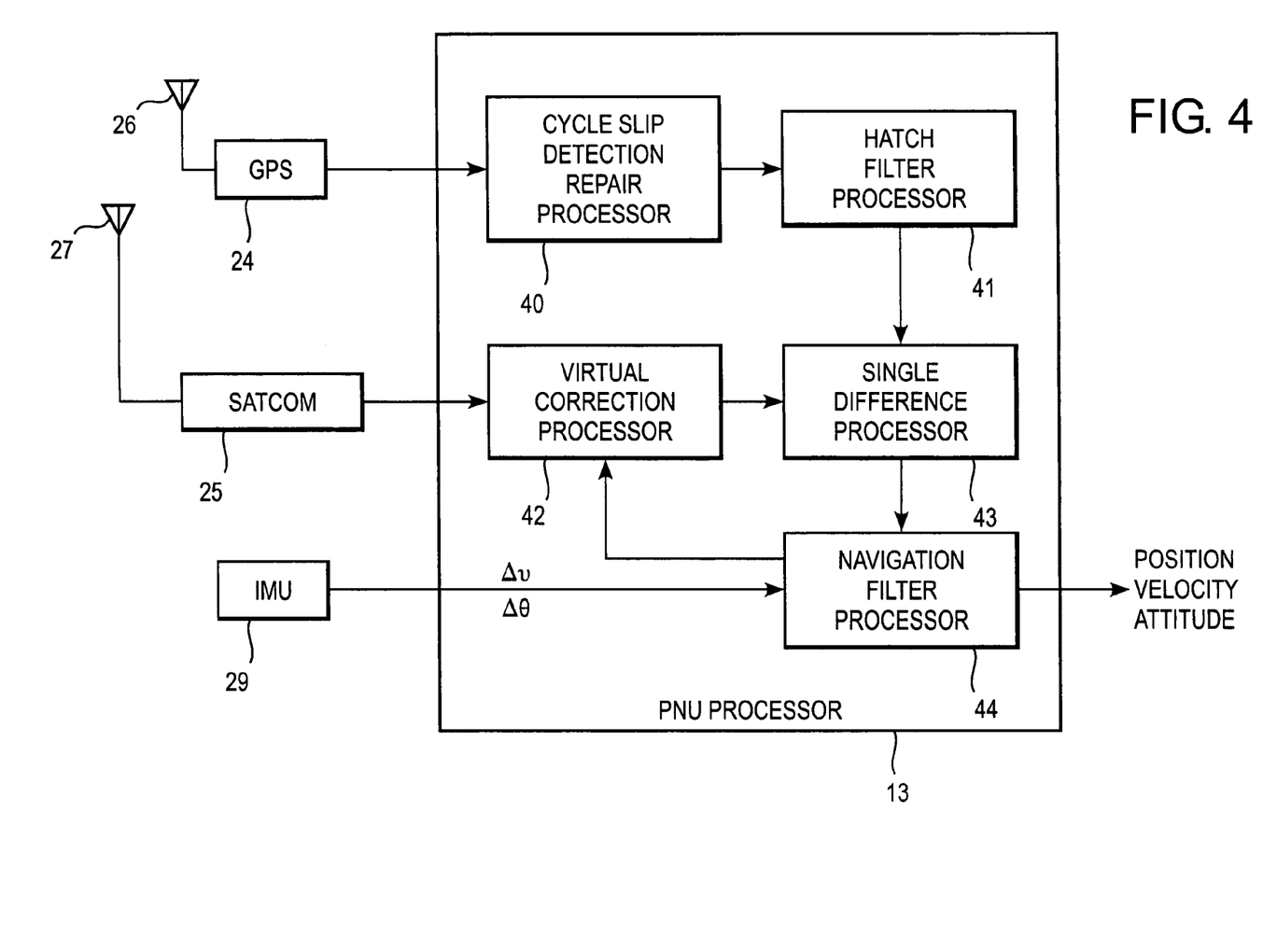
FIG. 4 is a block diagram of a PNU processor.

For the PNU 12 and the RRS 23, a key processing component is the PNU Processor 13 (FIG. 4), which combines inertial data from the IMU 29, measurement data from the GPS receiver 24, and corrections transmitted via the SATCOM processor 25 into an integrated navigation solution that can be used in applications including but not limited to guiding weapons 10 and generating a fire control solution. The key steps for the PNU Processor 13 start with the smoothing of the data using a standard Hatch filter processor 41. The Hatch filter processor 41 uses the GPS carrier phase measurement to smooth the GPS pseudorange measurement, which requires that the GPS carrier phase measurement be free of any cycle slips. GPS carrier phase cycles slips occur when the tracking loop in the GPS receiver 24 has lost synchronization with the carrier wave transmitted by the GPS satellites 16. These slips always consist of integral multiples of an offset according to the wavelength of the GPS carrier, due to the fact that the receiver tracking loop has regained synchronization with the cycle within a single wavelength while losing track of the total integral number of wavelengths when tracking was lost. The algorithm that is used to detect and repair this cycle slip depends upon the use of a precise velocity estimate along the line of sight to the GPS satellite 16 that allows the integer number of cycles to be estimated across a short time period. This algorithm works as long as the time period that is estimated across is not too large (e.g., less than 10 seconds), since the errors in the velocity estimate multiplied by the time period is proportional to the estimate in the number of cycles expected across that time period. The difference between the measured and expected number of cycles, rounded to the nearest integer, represents the cycle slip repair value, and is continuously estimated and applied to the carrier phase measurement. If no cycle slip has occurred, the cycle slip repair value will be zero, and will have no effect upon the measurement. The steps for performing this cycle slip detection and repair are as follows:

Single Difference Carrier Phase differences are processed to estimate the correct number of Cycles for a time step by the Cycle Slip Detection & Repair Processor 40 as follows:

Given:
- $\Phi_n^s$ = ionosphere free gps carrier phase measurement for satellite s and frame n
- $\phi_n^s$ = gps carrier phase measurement for satellite s and frame n in wavelength $\lambda$ cycles
- $\Delta t_n$ = time difference between frames n and n−1
- $\rho_n^s$ = geometric range estimate between satellite s and receiver for frame n
- $c_n^s$ = clock bias estimate between satellite s and receiver for frame n
- $T_n^s$ = tropospheric delay estimate between satellite s and receiver for frame n
- $U_n^s$ = unit vector between receiver and satellite s for frame n
- a = satellite that is tested for cycle slip The expected offset between measured and predicted values is given by:

$$b_n^s = (\rho_n^s + T_n^s + c_n^s) - (\rho_{n-1}^s - T_{n-1}^s - c_{n-1}^s)$$

Time differences in gps carrier phase measurements are then computed by:

$$\Delta\Phi_n^s = \Phi_n^s - \Phi_{n-1}^s$$

$$\Delta\phi_n^s = \phi_n^s - \phi_{n-1}^s$$

The following system of single difference equations is solved using least squares to obtain change in position over time interval ($\Delta\bar{r}_n$)

$$\begin{bmatrix} b_n^2 - b_n^a + \Delta\Phi_n^2 - \Delta\Phi_n^a \\ b_n^3 - b_n^a + \Delta\Phi_n^3 - \Delta\Phi_n^a \\ \cdots \\ b_n^s - b_n^a + \Delta\Phi_n^s - \Delta\Phi_n^a \end{bmatrix} = \begin{bmatrix} U_n^2 - U_n^a \\ U_n^3 - U_n^a \\ \cdots \\ U_n^s - U_n^a \end{bmatrix} \Delta\bar{r}_n$$

where s∈{satellites with measurements for frame n and n−1}

The following system of equations for integral cycle slip repair value is solved using least squares $$\text{slip} = \frac{1}{\lambda}\left(\begin{bmatrix} b_n^2 - b_n^a \\ b_n^3 - b_n^a \\ \cdots \\ b_n^s - b_n^a \end{bmatrix} - \begin{bmatrix} U_n^2 - U_n^a \\ U_n^3 - U_n^a \\ \cdots \\ U_n^s - U_n^a \end{bmatrix} \Delta\bar{r}_n\right) + \begin{bmatrix} \Delta\varphi_n^2 - \Delta\varphi_n^a \\ \Delta\varphi_n^3 - \Delta\varphi_n^a \\ \cdots \\ \Delta\varphi_n^s - \Delta\varphi_n^a \end{bmatrix}$$

The differences between estimated Cycles and Measured Cycles are rounded to the nearest integer, and applied to Carrier Phase Measurement as Cycle Slip:

$$\phi_n^s = \phi_n^s + \text{round(slip)}$$

Another component of the PNU Processor 13 is the Virtual Correction Processor 42, which converts the meta-correction message broadcast by the CPN 18 via the SAT-COM processor 25, and computes a virtual correction that is valid for the current navigation position. The meta-correction surface generated by the CPN 18 is characterized by a set of partial derivatives covering spatial and temporal variations in the wide area correction. The steps for generating the position and velocity corrections for each satellite single difference measurement are as follows:

Compute Position Correction from the Meta-Correction Partial Derivatives given:

- $\lambda_0 = PNU$ Geodetic Latitude
- $\Omega_0 = PNU$ Geographic Longitude
- $C_0 = $ Zeroth Order Wide Area Correction
- $\frac{\partial C}{\partial t} = $ Wide Area Correction Temporal Derivative
- $\frac{\partial C}{\partial \lambda} = $ Wide Area Correction North Derivative
- $\frac{\partial C}{\partial \Omega} = $ Wide Area Correction East Derivative
- $\frac{\partial^2 C}{\partial \lambda \partial \Omega} = $ Wide Area Correction North/East Coupling
- $\frac{\partial^2 C}{\partial \lambda^2} = $ Wide Area Correction North Rate Derivative
- $\frac{\partial^2 C}{\partial \Omega^2} = $ Wide Area Correction East Rate Derivative
- $\frac{\partial^2 C}{\partial \lambda \partial t} = $ Wide Area Correction North/Temporal Coupling
- $\frac{\partial^2 C}{\partial \Omega \partial t} = $ Wide Area Correction East/Temporal Coupling
- $\frac{\partial^2 C}{\partial t^2} = $ Wide Area Correction Acceleration Derivative Virtual line of sight position correction is computed from the meta-correction:

$$\delta C = C_0 + \frac{\partial C}{\partial t}\Delta t + \frac{\partial C}{\partial \lambda}\lambda_0 + \frac{\partial C}{\partial \Omega}\Omega_0 + \frac{\partial^2 C}{\partial \lambda \partial \Omega}\lambda_0 \Omega_0 + \frac{\partial^2 C}{\partial \lambda^2}\frac{\lambda_0^2}{2} + \frac{\partial^2 C}{\partial \Omega^2}\frac{\Omega_0^2}{2} + \frac{\partial^2 C}{\partial \lambda \partial t}\lambda_0 \Delta t + \frac{\partial^2 C}{\partial \Omega \partial t}\Omega_0 \Delta t + \frac{\partial^2 C}{\partial t^2}\frac{\Delta t^2}{2}$$

Compute Velocity Correction from the Meta-Correction Partial Derivatives Virtual line of sight velocity correction is computed from the meta-correction as the time derivative of the line of sight position correction:

$$\delta\dot{C} = \frac{\partial C}{\partial t} + \frac{\partial^2 C}{\partial \lambda \partial t}\lambda_0 \Delta t + \frac{\partial^2 C}{\partial \Omega \partial t}\Omega_0 + \frac{\partial^2 C}{\partial t^2}\Delta t$$

Another component of the PNU Processor 13 is the Single Difference Processor 43, which combines the smoothed ionosphere free GPS measurement supplied by the Hatch Filter Processor 41 with the corrections computed from the Virtual Correction Processor 42. The resulting set of corrections is formed into a single difference measurement in order to cancel out any GPS receiver clock errors, and are then decorrelated and fed into a Navigation Filter Processor 44. The navigation filter processor 44 uses standard Kalman Filter techniques to update a navigation solution with data from the GPS receiver 24 while integrating the IMU 29 outputs to obtain time tagged position, velocity and attitude between updates. These corrections of the GPS measurement data provide the precise position and velocity updates needed to maintain small relative navigation accuracies. The steps for generating GPS position and velocity line of sight updates involve the determination of the satellite to be differenced in the measurement, along with a combination of the correction data with both GPS pseudorange and GPS carrier phase data to obtain a single difference observable that is subsequently combined in a weighted fashion that decouples the observations from individual satellites. The Doppler integral measurement for velocity is obtained through a combination of filtered ionosphere rate data along with narrowlane carrier phase measurement data. This approach minimizes the noise in the velocity measurement, since the ionosphere rate is slowly varying and the narrowlane carrier phase measurement uses the smallest wavelength of all integer combinations of the GPS measurement data. The decorrelation filter for both position and velocity line of sight measurements combines these measurements in a way that eliminates the dependence between measurements that was introduced when one single satellite measurement was differenced from all others, under the assumption that all satellite measurements have close to the same measurement noise. This decorrelation allows much more efficient processing of the measurements because the navigation Kalman filter can canonically process each measurement individually, rather than altogether simultaneously.

These Steps are now described in greater detail:

Determine the Anchor Satellite that is differenced from all other Satellites. The anchor satellite that is common to both meta-correction and GPS measurement is found.

Given $a_c$ is the anchor satellite that is differenced from all other satellites in the corrections, find any arbitrary anchor satellite a that is common to both corrections and measurements.

Form the Single Differenced Corrected Position Measurement.

Given $pr_n^s$ = ionosphere free pseudorange measurement for satellite s and frame n $c_n^s$ = clock bias estimate between satellite s and receiver for frame n $T_n^s$ = tropospheric delay estimate between satellite s and receiver for frame n $\delta C_n^s$ = Single Difference Correction for satellite s and frame n $\sigma_{p_n}^s$ = root-variance of errors in the Position Measurement for satellite s and frame n compute the single difference corrected line of sight position for anchor a:

$$p_n^s = (pr_n^s + c_n^s - T_n^s + \delta C_n^s) - (pr_n^a + c_n^a - T_n^a + \delta C_n^a)$$

Also compute single difference position noise variance:

$$(\sigma_{p_n}^s)^2 = \begin{cases} (\sigma_{pr_n}^s)^2 + (\sigma_{pr_n}^a)^2 & \text{when correction is applied} \\ (\sigma_{pr_n}^s)^2 + (\sigma_{pr_n}^a)^2 + \sigma_{clockbias}^2 & \text{otherwise} \end{cases}$$

Generate Independent Position Measurement Observations

A decorrelated position measurement is computed for input to the navigation filter:

$$z_{p_n}^s = p_n^s - \frac{1}{s}\sum_{k=1}^{s-1} p_n^k \text{ for } s \in \{\text{measurement satellites excluding anchor}\}$$

A decorrelated noise variance corresponding to measurement is computed:

$$R_{p_n} = (\sigma_{p_n}^s)^2 + \frac{1}{s^2}\sum_{k=1}^{s-1}(\sigma_{p_n}^k)^2$$

Generate the Ionosphere Free Doppler Integral for Velocity Processing

Given $I_n^s$ = carrier phase ionosphere measurement for satellite s and frame n $\Phi_{w_n}^s$ = widelane carrier phase measurement for satellite s and receiver for frame n $\sigma_{v_n}^s$ = root-variance of errors in the Velocity Measurement for satellite s and frame n compute the filtered ionosphere rate from carrier phase ionosphere differences:

$$\Delta I_n^s = \frac{3}{2}I_n^s - 2I_{n-1}^s + \frac{1}{2}I_{n-2}^s.$$

Filter ionosphere rate from this measurement equation.

Compute the ionosphere free doppler integral:

$$\Phi_n^s = \Phi_{w_n}^s + \Delta I_n^s$$

Form the Single Differenced Precision Velocity Measurement

The single difference corrected line of sight velocity integral is computed according to:

$$\Delta v_n^s = (\Phi_n^s + c_n^s - T_n^s + \delta C_n^s) - (\Phi_n^a + c_n^a - T_n^a + \delta C_n^a) - (\Phi_{n-1}^s + c_{n-1}^s - T_{n-1}^s + \delta C_{n-1}^s) + (\Phi_{n-1}^a + c_{n-1}^a - T_{n-1}^a + \delta C_{n-1}^a)$$

The single difference velocity noise variance is computed according to:

$$(\sigma_{b_n}^s)^2 = \begin{cases} (\sigma_{\Phi_n}^s)^2 + (\sigma_{\Phi_n}^s)^2 & \text{when correction is applied} \\ (\sigma_{\Phi_n}^s)^2 + (\sigma_{\Phi_n}^s)^2 + \sigma_{clockdrift}^2 \end{cases}$$

Generate Independent Velocity Measurement Observations.

The decorrelated velocity measurement is computed for input to the navigation filter:

$$z_{v_n}^s = v_n^s - \frac{1}{s}\sum_{k=1}^{s-1} \Delta v_n^k \text{ for } s \in \{\text{measurement satellites excluding anchor}\}$$

The decorrelated noise variance corresponding to measurement is computed according to:

$$R_{v_n} = (\sigma_{v_n}^s)^2 + \frac{1}{s^2}\sum_{k=1}^{s-1}(\sigma_{v_n}^k)^2$$

Figure 5:
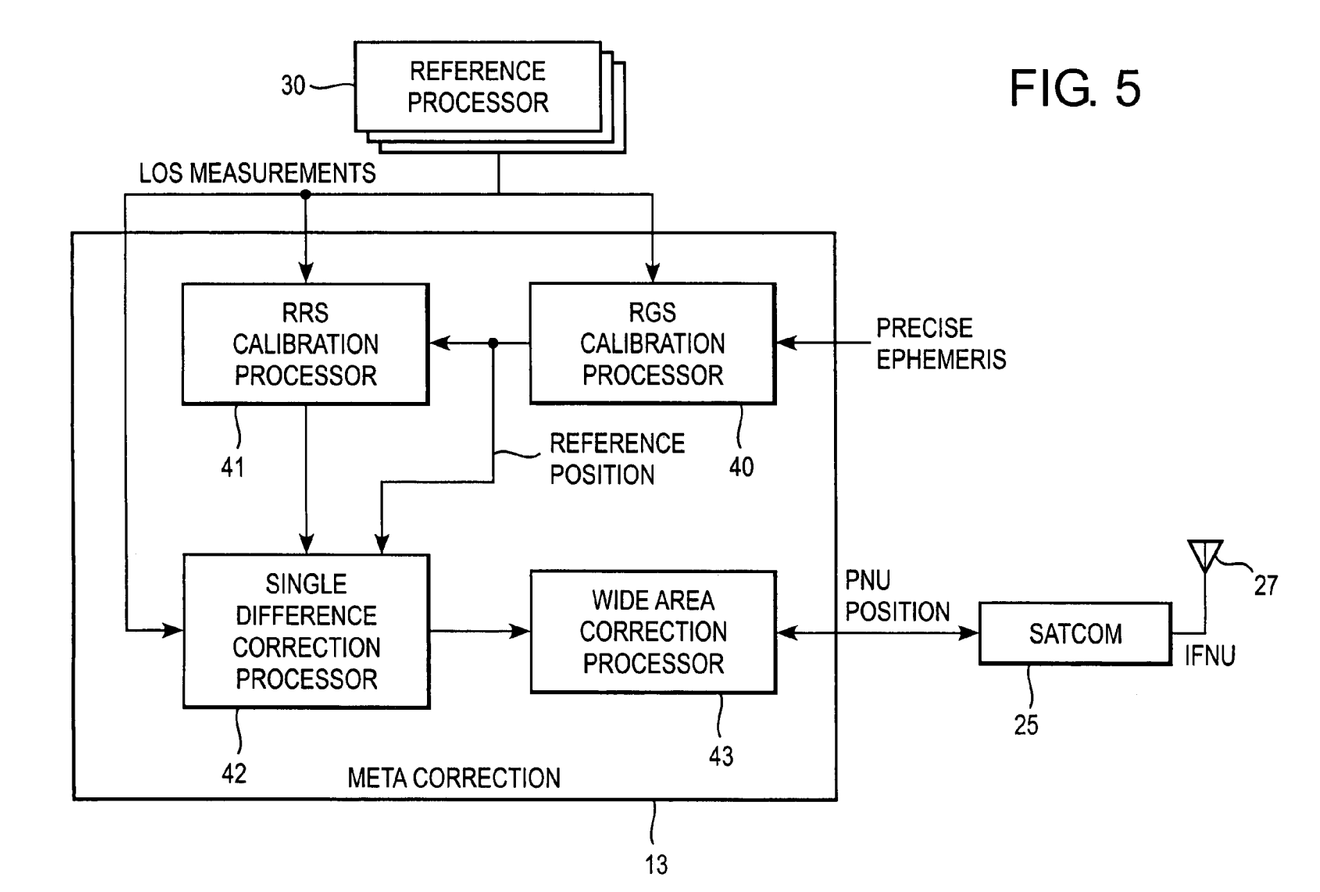
FIG. 5 is a block diagram of a Meta processor.

FIG. 5 shows the design details of the meta-correction processor 38, which uses data from the reference processors 30 to both calibrate and continuously compute a set of meta-corrections for the wide area. Two calibration processors are necessary for the two types of reference sources that are available. The RGS calibration processor 40 uses the measurement information obtained from the RGSs 22 through the Reference Processor 30 to compute the system-wide calibrated positions of these sensors. Since the RGSs 22 are stationary sensors, these positions are computed only when the network wide configuration of the sensors changes. This calibration is performed through the use of standard geodetic survey techniques, using up to 6 hours of data from each reference sensor, along with precise GPS ephemeris obtained for the time of data collection after the fact. The resulting calibrated reference positions for each RGS 22 are passed to an RRS Calibration Processor 41 and to the Single Difference Correction Processor 42. The RRS Calibration Processor 41 continuously computes for every data sample the calibrated position of each RRS 23, since each RRS position changes according to the motion of its corresponding platform. This is done through the use of current state of the art double differenced integer fixed GPS carrier phase processing used in geodetic surveying that provides a precise relative location of the RRS 23 relative to the other reference sensors in the system. This approach requires the fixing of integer ambiguities for the GPS carrier phase measurement data from the RRS 23 against the double differenced carrier phase measurement of the GPS carrier phase measurements from the RGS 22. Once the integer ambiguities are established, a precise navigation solution relative to the RGS 22 network can be straightforwardly calculated, since the calibrated reference positions of each RGS 22 are available to the RRS Calibration Processor 41. The Single Difference Correction Processor 42 uses the GPS line of sight data from the Reference Processor 30, along with the calibrated reference position data from the RRS Calibration Processor 41 and the RGS Calibration Processor 40 to compute single difference corrections for each satellite measurement. The single difference algorithmic approach is used to cancel receiver clock errors, to mirror the steps performed in the Virtual Correction Processor 42 as part of the PNU processor 13 in FIG. 4. An exemplary embodiment of this key process uses the following steps to compute the single differenced correction for each satellite:

Determine the Anchor Satellite to be Differenced From All Other Satellites:

An anchor satellite a that is common to both previous frame and current frame measurements is found.

Form the Single Differenced Position Correction for each Reference Sensor

Given $pr_n^s$=ionosphere free pseudorange measurement for satellite s and frame n $c_n^s$=clock bias estimate between satellite s and receiver for frame n $T_n^s$=tropospheric delay estimate between satellite s and receiver for frame n $\sigma_{p_n}^s$=root-variance of errors in the Position Measurement for satellite s and frame n $\bar{r}_n^s$=satellites position at transmit time of gps signal for frame n $\bar{r}_{r_n}$=reference sensor calibrated position at receipt time for frame n compute geometric distance between satellite and receiver according to:

$$\rho_n^s = \sqrt{(\bar{r}_n^s - \bar{r}_{r_n})^T(\bar{r}_n^s - \bar{r}_{r_n})}$$

A single difference corrected line of sight position for anchor a is computed according to:

$$\delta C_n^s = (\rho_n^s - pr_n^s - c_n^s + T_n^s) - (\rho_n^a - pr_n^a - c_n^a + T_n^a)$$

A single difference line of sight position noise variance is computed according to:

$$(\sigma_{\delta C_n}^s)^2 = (\sigma_{pr_n}^s)^2 + (\sigma_{pr_n}^a)^2$$

Generate the Ionosphere Free Doppler Integral for Velocity Processing

Given $I_n^s$=carrier phase ionosphere measurement for satellite s and frame n $\Phi_{w_n}^s$=widelane carrier phase measurement for satellite s and receiver for frame n $\sigma_{v_n}^s$=root-variance of errors in the Velocity Measurement for satellite s and frame n A filtered ionosphere rate is computed from carrier phase ionosphere differences:

$$\Delta I_n^s = \frac{3}{2}I_n^s - 2I_{n-1}^s + \frac{1}{2}I_{n-2}^s$$

Filter the ionosphere rate from this measurement equation

The ionosphere free doppler integral is computed according to:

$$\Phi_n^s = \Phi_{w_n}^s + \Delta I_n^s \qquad 5$$

Form the Single Differenced Velocity Correction for each Reference Sensor

A single difference corrected line of sight velocity integral is computed according to:

$$\Delta C_n^s = (\rho_n^s - \Phi_n^s - c_n^s + T_n^s) - (\rho_n^a - \Phi_n^a - c_n^a + T_n^a) - (\rho_{n-1}^s - \Phi_{n-1}^s - c_{n-1}^s + T_{n-1}^s) + (\rho_{n-1}^a - \Phi_{n-1}^a - c_{n-1}^a + T_{n-1}^a)$$

A single difference velocity noise variance is computed according to:

$$(\sigma_{\Delta C_n^s})^2 = (\sigma_{101_n}^s)^2 + (\sigma_{101_n}^s)^2$$

The individual corrections for each reference sensor are combined in the Wide Area Correction Processor 43, to provide a set of time varying coefficients that is used in the PNU Processor 13 to compute virtual corrections through the Virtual Correction Processor 42. These corrections are produced through a set of decoupled Kalman filters for each line of sight GPS measurement, which use the previously computed corrections as measurement inputs to the filter model. The resulting parameters are broadcast via the SAT-COM processor 25 to all of the PNUs 12 and RRSs 23 within the theater covered by the wide area. In addition, each PNU 12 or RRS 23 sends back to the CPN 18 an individual status, which allows the Wide Area Correction Processor 43 to select the set of corrections that is required for each unit, in the case of multiple theaters and other wide areas providing world wide coverage. These key steps are detailed as follows:

Filter each individual satellite using the following linear Kalman Filter Model. Set up observation for each line of sight model for satellites and frame n according to:

$$z_n^s = \begin{bmatrix} \delta C_n^s \\ \Delta C_n^s \end{bmatrix}$$

A noise matrix for each observation is set up according to:

$$R_n^s = \begin{bmatrix} (\sigma_{\delta C_n}^s)^2 & 0 \\ 0 & (\sigma_{\Delta C_n}^s)^2 \end{bmatrix}$$

A measurement model is set up for each satellite s and frame n and each reference sensor r given $\lambda_r$ = calibrated geodetic latitude for reference sensor r
$\Omega_r$ = calibrated geodetic longitude for reference sensor r
$\Delta t$ = time period between current and previous frame $$H_n^s = \begin{bmatrix} 1 & 0 & \lambda_r & \Omega_r & \lambda_r \Omega_r & \lambda_r^2 & \Omega_r^2 & 0 & 0 & 0 \\ 0 & \Delta t & 0 & 0 & 0 & 0 & 0 & \lambda_r \Delta t & \Omega_r \Delta t & \frac{\Delta t^2}{2} \end{bmatrix}$$

A Kalman filter is used to estimate the following correction states:

$$\bar{x}_n^s = \begin{bmatrix} C_0 & \frac{\partial C}{\partial t} & \frac{\partial C}{\partial \lambda} & \frac{\partial C}{\partial \Omega} & \frac{\partial^2 C}{\partial \lambda \partial \Omega} & \frac{\partial^2 C}{\partial \lambda^2} & \frac{\partial^2 C}{\partial \Omega^2} & \frac{\partial^2 C}{\partial \lambda \partial t} & \frac{\partial^2 C}{\partial \Omega \partial t} & \frac{\partial^2 C}{\partial t^2} \end{bmatrix}$$

Select and Format Corrections Based upon the Location Reported by each Unit.

a) The position of the unit reported by a status message sent from the PNU to the CPN is bounded by reference sensors using a standard clipping algorithm.

b) If the unit is not bounded by any reference sensor, then do not report any corrections.

c) If the unit is bounded by a set of reference sensors, then send the set of correction data for those sensors.

From the foregoing, it can be seen that the present invention provides a precision closed loop guidance and navigation system that improves accuracy by reducing both navigation errors and the relative target location errors. These errors are reduced through the use of multiple, widely-spaced remote GPS sensors, both moving and/or fixed, which receive GPS line-of-sight signals. These signals are provided to a central processing node, which combines them to generate a meta-correction message that covers the theatre of operations approximately defined by the location of the remote GPS sensors. The meta-correction message is usable over a significantly large region because, among other things, it is based on a single differenced precision velocity measurement (i.e., single difference corrected line of sight velocity integral and single difference velocity noise variance), as described in detail above. The single differenced velocity correction can be formed for each reference sensor.

The techniques described herein are applicable for various forms of GPS signals, including commercial versions as well as military versions (which are encoded).

A significant advantage of the present invention lies in the fact that the closed-loop guidance and navigation accuracy is available over a significantly large region, which is not currently possible using standard differential GPS techniques. Even though the fire control platform, weapon and target may be widely separated from one another, the relatively large area of coverage provides co-alignment for them; that is, they share the same error characteristics.

A further advantage lies in the fact that the measured error data has value over a long period of time. As a result, the fire control platform 14 and the weapon 10 do not need to coexist in time or space. For instance, if the fire control platform is an airplane or a satellite, it may not be able to receive an image of the target at the time the weapon 10 is traveling to the target, due to adverse weather conditions. However, if the fire control platform 14 was able to view the target on a previous day, the positional information can be corrected in accordance with the parameterized correction message that was generated at the time of the sighting, to provide a precise location of the destination.

The various aspects of the invention have been described in connection with a number of exemplary embodiments. To facilitate an understanding of the invention, many aspects of the invention were described in terms of sequences of actions to be performed by elements of a computer and/or other processing system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

It will be appreciated by those of ordinary skill in the art that the present invention can be embodied in other forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A system for navigation, comprising:
   a plurality of reference sensors, each receiving data from a global positioning system and generating therefrom reference sensor data;
   a central processing node which receives the reference sensor data from each of the reference sensors, computes a set of correction parameters based upon detected global positioning system errors indicated by the reference sensor data and based upon single differenced velocity corrections, and transmits said correction parameters;
   a fire control platform that determines the position of a destination, receives the correction parameters transmitted by the central processing node, and corrects the determined position in accordance with the correction parameters; and
   a weapon system which receives the corrected target position of the destination from the fire control platform and position data from the global positioning system, and steers itself to the target in accordance with the received position information;
   wherein the single differenced velocity corrections are based on differences between signals received from different satellites.

2. A method for navigation within a theater of operations, comprising the steps of:
   receiving positioning system satellite signals at a plurality of spaced apart known locations, wherein the known locations approximately define the theater of operations;
   determining a measure of error in the positioning system satellite signals for each known location;
   generating single differenced velocity corrections; and
   utilizing the measures of error in the positioning system satellite signals and the single differenced velocity corrections to obtain correction data for locating unknown locations within the theater of operations;
   wherein the single differenced velocity corrections are based on differences between signals received from different satellites.

3. The method of claim 2, further including:
   obtaining a relative measure of location to an unknown location within the theater of operations from one of the known locations.

4. The method of claim 3, further including:
   using the relative measure of location to develop navigation and guidance directions to the unknown location within the theater of operations from one of the known locations within the theater of operations.

5. The method of claim 2, wherein the positioning system satellite signals are generated by the Global Positioning System.

6. A system for navigation within a theater of operations, comprising:
   a plurality of spaced apart positioning system sensors at calibrated locations that approximately define the theater of operations;
   means for determining a measure of error in positioning system satellite signals received by each positioning system sensor;
   means for determining single differenced velocity corrections; and
   means for using the measures of error in the positioning system satellite signals and the single differenced velocity corrections to obtain correction data for locating unknown locations within the theater of operations;
   wherein the single differenced velocity corrections are based on differences between signals received from different satellites.

7. The system of claim 6, wherein:
   each of the positioning system sensors is selected from a group consisting of stationary and mobile positioning system sensors.

8. The system of claim 6, wherein the positioning system sensors are spaced one from another up to a maximum separation such that the positioning system sensors have line of sight communications with at least four common positioning system satellites.

9. The system of claim 6, further including:
   means with a mobile platform within the theater of operations for receiving said correction data and correcting a positioning system-determined location of the mobile platform.

10. The system of claim 6, further including:
    means with a fire control platform within the theater of operations for receiving said correction data and using the correction data and positioning system data to generate a positioning system-determined location of a fire control platform.

11. The system of claim 6, further including:
    means with a weapon deployed within the theater of operations for receiving said correction data and using the correction data to precisely guide the weapon to a target location within the theater of operations.

12. The system of claim 6, wherein the positioning system satellite signals are generated by the Global Positioning System.

13. A method of generating a location of a target, the method comprising:
    at each of a plurality of reference sensors, receiving signals from a plurality of positioning system satellites;
    generating a set of error measurements by generating, for each of the reference sensors, one or more error measurements based on a reference location of the reference sensor and information derived from the signals received at the reference sensors from the plurality of position system satellites;

generating single differenced velocity corrections;
at a central processing node, generating a meta-correction surface from the set of error measurements and the single differenced velocity corrections;
transmitting the meta-correction surface to a non-reference sensor; and
using the meta-correction surface and signals received from a plurality of position system satellites to generate the location of the target; wherein
wherein the single differenced velocity corrections are based on differences between signals received from different satellites.

14. The method of claim 13, wherein the target is co-located with the non-reference sensor.

15. The method of claim 13, wherein the target is not co-located with the non-reference sensor.

16. The method of claim 13, wherein each of the error measurements is generated at a respective one of the reference sensors, and the method further comprises transmitting the set of error measurements from the reference sensors to the central processing node by means of a communications satellite.

17. The method of claim 13, wherein transmitting the meta-correction surface to the non-reference sensor is performed using a communications satellite.

18. The method of claim 13, wherein generating the set of error measurements is performed at the central processing node.

19. The method of claim 13, wherein the error measurements represent systematic errors in the received signals from the plurality of positioning system satellites.

20. The method of claim 13, wherein the plurality of positioning system satellites are at least a part of the Global Positioning System.

21. A system for generating a location of a target, the system comprising:
a plurality of reference sensors, wherein each reference sensor receives signals from a plurality of positioning system satellites;
one or more processors for generating a set of error measurements by generating, for each of the reference sensors, one or more error measurements based on a reference location of the reference sensor and information derived from the signals received at the reference sensors from the plurality of position system satellites, and by generating single differenced velocity corrections;
a central processing node that generates a meta-correction surface from the set of error measurements and the single differenced velocity corrections;
a transmitter for transmitting the meta-correction surface to a non-reference sensor;
at the non-reference sensor:
a receiver for receiving signals from a plurality of the positioning system satellites; and
a processor that uses the meta-correction surface and the signals received from the plurality of the positioning system satellites to generate the location of the target; wherein
wherein the single differenced velocity corrections are based on differences between signals received from different satellites.

22. The system of claim 21, wherein the target is co-located with the non-reference sensor.

23. The system of claim 21, wherein the target is not co-located with the non-reference sensor.

24. The system of claim 21, wherein each of the error measurements is generated at a respective one of the reference sensors, and the system further comprises a transmitter for transmitting the set of error measurements from the reference sensors to the central processing node by means of a communications satellite.

25. The system of claim 21, wherein the transmitter for transmitting the meta-correction surface to the non-reference sensor transmits the meta-correction surface to the non-reference sensor via a communications satellite.

26. The system of claim 21, wherein the processor for generating the set of error measurements is located at the central processing node.

27. The system of claim 21, wherein the error measurements represent systematic errors in the received signals from the plurality of positioning system satellites.

28. The system of claim 21, wherein the plurality of positioning system satellites are at least a part of the Global Positioning System.

29. The system of claim 1, wherein the single difference velocity corrections include single difference velocity noise variances.

30. The method of claim 2, wherein the single difference velocity corrections include single difference velocity noise variances.

31. The system of claim 6, wherein the single difference velocity corrections include single difference velocity noise variances.

32. The method of claim 13, wherein the single difference velocity corrections include single difference velocity noise variances.

33. The system of claim 21, wherein the single difference velocity corrections include single difference velocity noise variances.

34. The system of claim 1, wherein the correction parameters include GPS carrier phase cycle slip corrections based on single difference velocity measurements.

35. The method of claim 2, comprising detecting and correcting GPS carrier phase cycle slip based on single difference velocity measurements.

36. The system of claim 6, wherein the correction data include GPS carrier phase cycle slip corrections based on single difference velocity measurements.

37. The method of claim 13, wherein the meta correction surface is generated based on carrier phase cycle slip corrections, wherein the carrier phase cycle slip corrections are based on single difference velocity measurements.

38. The system of claim 21, wherein the central processing node generates the meta correction surface based on carrier phase cycle slip corrections, wherein the carrier phase cycle slip corrections are based on single difference velocity measurements.

* * * * *